United States Patent
Chen (10) Patent No.: US 9,992,181 B2
(45) Date of Patent: Jun. 5, 2018

(54) METHOD AND SYSTEM FOR AUTHENTICATING A USER BASED ON LOCATION DATA

(71) Applicant: Yuszu Chen, Woodbridge, VA (US)

(72) Inventor: Yuszu Chen, Woodbridge, VA (US)

( * ) Notice: Subject to any disclaimer, the term of this patent is extended or adjusted under 35 U.S.C. 154(b) by 0 days. days.

(21) Appl. No.: 15/633,465

(22) Filed: Jun. 26, 2017

(65) Prior Publication Data

US 2018/0103019 A1    Apr. 12, 2018

Related U.S. Application Data (60) Provisional application No. 62/405,742, filed on Oct. 7, 2016.

(51) Int. Cl.

| | |
|---|---|
| *H04W 12/08* | (2009.01) |
| *H04L 29/06* | (2006.01) |
| *H04W 4/02* | (2018.01) |
| *H04W 8/02* | (2009.01) |
| *H04W 12/06* | (2009.01) |
| *H04L 9/32* | (2006.01) |

(52) U.S. Cl.
CPC .......... *H04L 63/0492* (2013.01); *H04W 4/021* (2013.01); *H04L 9/3297* (2013.01); *H04L 63/08* (2013.01); *H04W 8/02* (2013.01); *H04W 12/06* (2013.01)

(58) Field of Classification Search
CPC . H04W 4/023; H04W 52/0296; H04W 64/00; H04W 4/02; H04W 4/028; H04M 1/72519; G06Q 30/0269
USPC .................... 455/456.2, 456.1, 456.3, 414.2; 342/357.52
See application file for complete search history.

(56) References Cited

U.S. PATENT DOCUMENTS

| | | | |
|---|---|---|---|
| 2015/0160328 A1* | 6/2015 | Peinhardt | .............. G01S 5/0036 455/456.3 |
| 2017/0132903 A1* | 5/2017 | Vega | ...................... G08B 21/24 |

* cited by examiner

*Primary Examiner* — Phuoc H Doan (57) ABSTRACT

Disclosed is a method of authenticating a user based on location data. The method includes receiving, using a communication device, a user location from a location tracking device associated with the user. Further, the method includes receiving, using the communication device, a terminal location from a computing terminal. Yet further, the method includes computing, using a processing device, a distance between the user location and the terminal location. Further, the method includes performing, using the processing device, a first comparison of the distance with a first predetermined threshold value. Moreover, the method includes authenticating, using the processing device, the user based on a first result of the first comparison.

18 Claims, 6 Drawing Sheets

METHOD AND SYSTEM FOR AUTHENTICATING A USER BASED ON LOCATION DATA

The current application claims a priority to the U.S. Provisional Patent application Ser. No. 62/405,742 filed on Oct. 7, 2016.

FIELD OF THE INVENTION

The present invention relates to user authentication. In particular, the present invention relates to a method and a system for authenticating a user based on location data.

BACKGROUND OF THE INVENTION

Across the globe, more people are spending more time online. Further, a majority of service providers, such as banks, retailers, and insurance companies, now rely heavily on internet connectivity. This enables users to easily access various services from remote locations. However, as technology becomes ubiquitous, the need for security also increases. The safe use of technology is challenged by hacker tools, viruses, remote tools, adware, spyware, Trojans and worms.

While electronic fraud is a problem, traditional theft can also lead to a considerable loss. For example, if a user's credit card is stolen, the offender has the opportunity to make purchases until the stolen card is reported and canceled.

Therefore, there is a need for improved methods and systems that provide additional security to users such that they can access online services in a safe, efficient and trustworthy fashion.

SUMMARY OF THE INVENTION

This summary is provided to introduce a selection of concepts in a simplified form that are further described below in the Detailed Description. This summary is not intended to identify key features or essential features of the claimed subject matter. Nor is this summary intended to be used to limit the claimed subject matter's scope.

Disclosed is a method of authenticating a user based on location data. The method includes receiving, using a communication device, a user location from a location tracking device associated with the user. Further, the method includes receiving, using the communication device, a terminal location from a computing terminal. Yet further, the method includes computing, using a processing device, a distance between the user location and the terminal location. Further, the method includes performing, using the processing device, a first comparison of the distance with a first predetermined threshold value. Moreover, the method includes authenticating, using the processing device, the user based on a first result of the first comparison.

According to some aspects, a system for authenticating a user based on location data is disclosed. The system includes a communication device configured to receive a user location from a location tracking device associated with the user and receive a terminal location from a computing terminal. Further, the system includes a processing device configured to compute a distance between the user location and the terminal location, perform a first comparison of the distance with a first predetermined threshold value and authenticate the user based on a first result of the first comparison.

According to some aspects, the present disclosure relates to a system that compares a user's location to the location of a computing terminal, and then uses the distance between the two as a determining factor when authenticating the user's identity.

According to some aspects, a position ID protection platform is disclosed. The position ID protection platform may function as a user authentication system that prevents unauthorized operations. By employing user location to determine if the user is the individual accessing secure environments or making purchases, the user authentication system improves upon the ever eroding security of the digital age. The position ID protection platform prevents access to secure environments such as bank accounts, social media accounts, and restricted locations, by making sure that the request to access these secure environments is made in the presence of an authorized user. The user authentication system works by tracking the location of a user and comparing this location to the location of the request. If the distance between the two locations is too great, the system prevents access.

According to some aspects, the disclosed system includes a user interface (UI) engine, a profile engine, a location engine, an authentication engine, a communication engine, and an applications programming (API) engine. The term engine is used herein to refer to collections of programs which are grouped based upon function. The system analyzes the location of a user in relation to the location of a computer terminal to determine if the user is the individual interacting with the computer terminal. The system uses a multi-step authentication process that is activated when a user's personal information is used to interact with a computing terminal. The term computing terminal is used herein to refer to an electronic system that functions as an interface, which enables an individual to send and receive electronic data. When the system detects the use of a user's personal information, a location query is sent to a location tracking device that is designed to track the physical location of the user. The physical location of the location tracking device is then compared to the physical location of the terminal into which the user's personal information was entered. If the distance between the location device and the computing terminal exceeds a certain threshold, the system generates an alert. This alert can be used to prevent a financial transaction, notify a user, deny access to a secure location, or perform similar predefined tasks.

Further, the UI engine is tasked with interpreting user input and generating graphical interfaces that convey system information. The UI engine generates menus and images and that enable a user to navigate through the present invention. The profile engine creates unique digital profiles for individual users. The users create a profile by entering personal information, such as demographic data, credit card numbers, user names, and passwords. Additionally, the users are able to create lists of locations and systems at which their personal information can be used without necessitating the proximity of the location tracking device. Therefore, the users are able to specify safe locations, such as stores or restaurants, at which a user's personal information can be used to perform an operation without first verifying the physical location of the location tracking device. This functionality enables a user to make a purchase at a neighborhood grocery store without bringing the location tracking device. Additionally, the user is able to specify computing terminals that are authorized to perform operations with the user's personal information without a nearby location tracking device.

Further, the location engine is tasked with determining the physical location of the computing terminal being used to perform an operation with a user's personal information, as well as, the physical location of the location tracking device. Further, a software application may run on a mobile device with a wireless radio and location tracking module, such as a smartphone or tablet computer. Alternatively, a dedicated location tracking device capable of wirelessly communicating with external systems may be used. Once the location engine has determined the physical location of the computing terminal and the location tracking device, the authentication engine is used to determine if the distance between the two devices is greater than a user defined threshold. If the distance exceeds the threshold, and the terminal has not been identified as a safe location, the authentication engine generates an alert. Otherwise, if the location tracking device is determined to be within the distance threshold, the authentication engine allows the operation to be performed unhindered. Further, the authentication engine may use biometric information to verify a user's identity. Additionally, the authentication engine may use identity verification protocols that employ passwords, key cards, picture recognition, and pattern inputs.

Further, the communication engine is tasked with facilitating the secure transmission and reception of information between computing terminals, a user's mobile device, and authorized third parties. Accordingly, the communication engine is used to relay data between a networked datacenter and any computing terminals being used to access the present invention. The API engine enables third party systems to write programs that directly interact with the system.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of authenticating users, embodiments of the present disclosure are not limited to use only in this context. For example, the disclosed techniques may be used to rank other items that given out for rent or sale.

Figure 1:
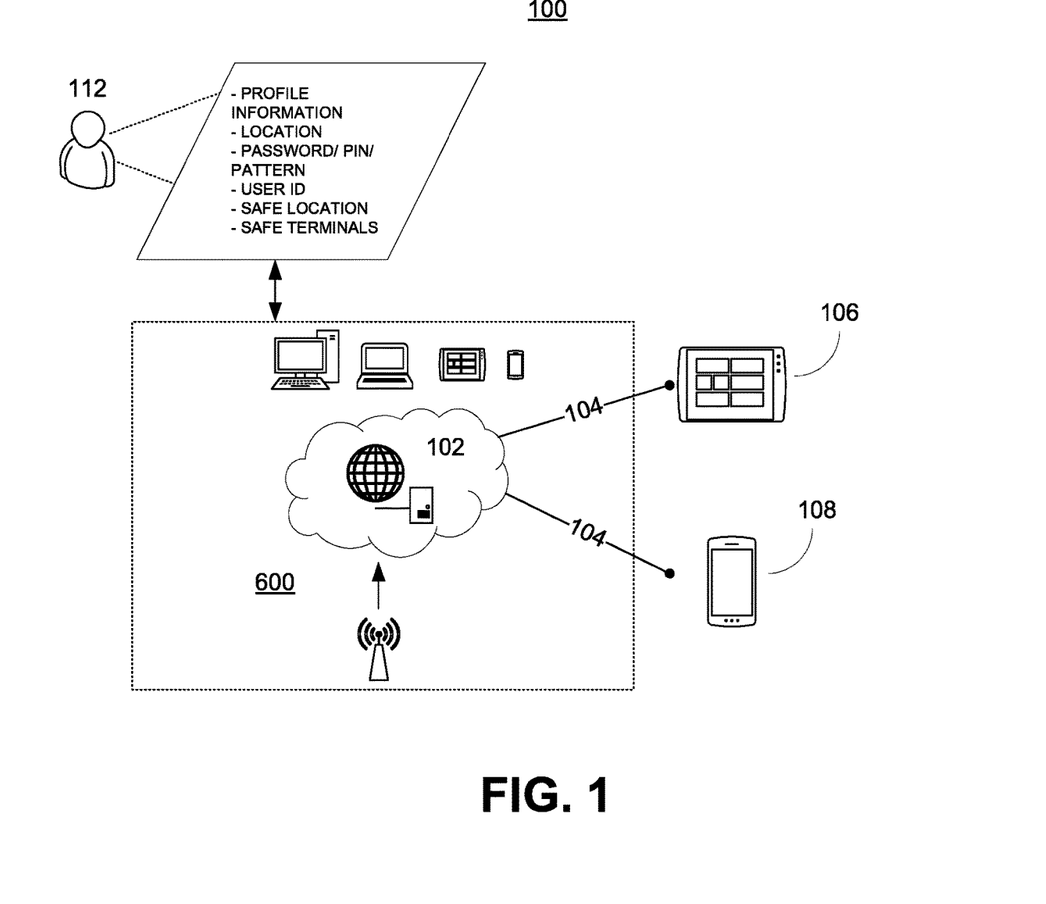
FIG. 1 illustrates an exemplary environment in which embodiments of the present disclosure may be implemented.

FIG. 1 is an illustration of a platform consistent with various embodiments of the present disclosure. By way of non-limiting example, the online platform 100 for authenticating users may be hosted on a centralized server 102, such as, for example, a cloud computing service. The centralized server 102 may communicate with other network entities, such as, for example, a mobile device (such as a smartphone, a laptop, a tablet computer etc.) and other electronic devices (such as desktop computers, etc.) over a communication network 104, such as, but not limited to, the Internet, radio frequency and microwave communication based network. Further, users of the platform may include one or more relevant parties such as, customers and administrators. Accordingly, electronic devices operated by the one or more relevant parties may be in communication with the platform. For example, the platform 100 may be in communication with a customer electronic device 106 operated by the customer, and an administrator electronic device 108 operated by the administrator.

A user 112, such as the one or more relevant parties, may access platform 100 through a software application. The software application may be embodied as, for example, but not be limited to, a website, a web application, a desktop application, and a mobile application compatible with a computing device 600. Accordingly, in an instance, the user 112 may be a customer who may provide location information and an administrator who may manage the platform 100 and the centralized server 102.

Figure 2:
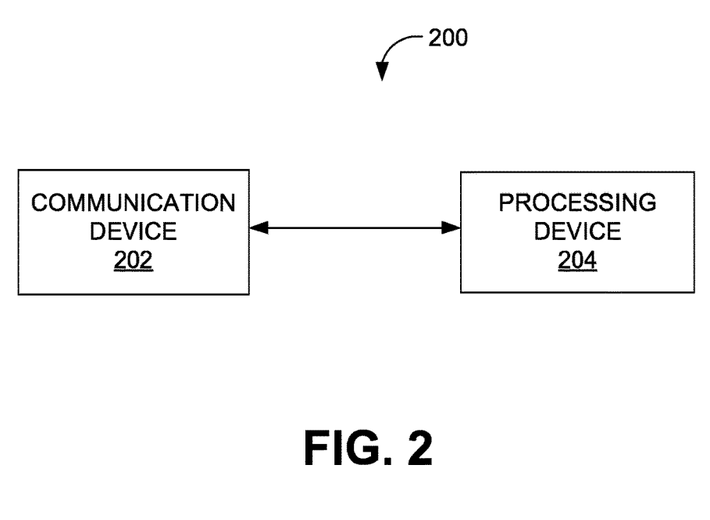
FIG. 2 illustrates a block diagram of a system of authenticating a user based on location data in accordance with some embodiments.

Turning to FIG. 2, a system 200 of authenticating a user based on location data is illustrated, in accordance with some embodiments. As shown, the system 200 includes a communication device 202 and a processing device 204.

Figure 3:
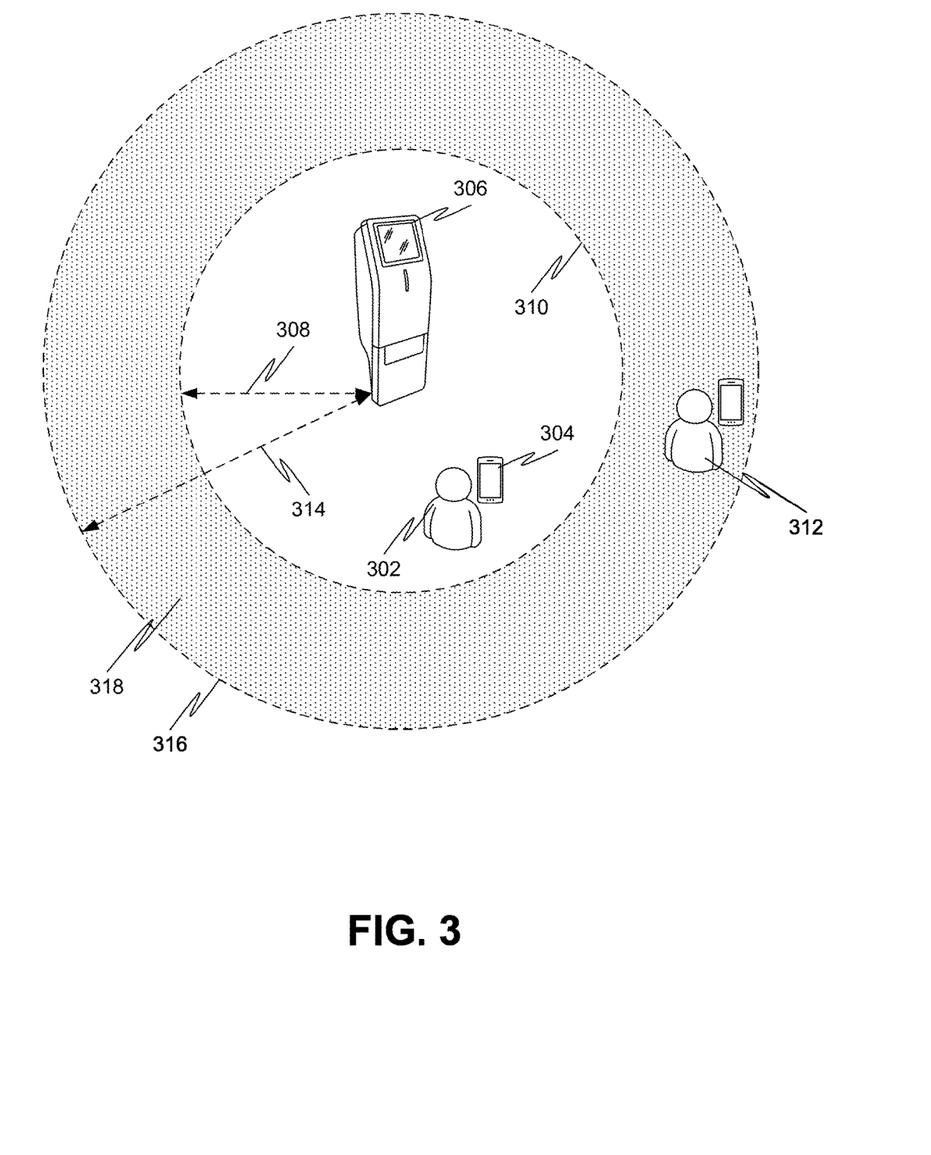
FIG. 3 is a schematic of an exemplary scenario in accordance with some embodiments.

The communication device 202 may be configured to receive a user location from a location tracking device associated with the user. For example, as shown in FIG. 3, a user 302 may carry a smartphone 304 with an in-built location tracking device. Accordingly, the communication device 202 may receive location of the user 302 from the smartphone 304. Further, the communication device 202 may be configured to receive a terminal location from a computing terminal. For example, the communication device 202 may receive a location from a computing terminal 306, as shown in FIG. 3. For example, the computer terminal 306 may be a kiosk.

The processing device 204 may be configured to compute a distance between the user location and the terminal location. For example, the processing device 204 may compute a distance between location of the user 302 and the location of the computing terminal 306. Thereafter, the processing device 204 may be configured to perform a first comparison of the distance with a first predetermined threshold value. For example, the first predetermined threshold value may be a certain distance 308 from the computing terminal 306. Therefore, the first predetermined threshold defines a circular region within a circle 310.

Further, the processing device 204 may be configured to authenticate the user based on a first result of the first comparison. For example, the processing device 204 may authenticate the user if the distance between the user location and the terminal location is less than the first predetermined threshold value. Accordingly, the user 302 may be authenticated, but the user 312 may not be authenticated.

According to some embodiments, the communication device 202 may be further configured to transmit an alert to an electronic device associated with the user, wherein the alert is transmitted based on the distance exceeding the first predetermined threshold value. The alert may be used to prevent a financial transaction, notify a user, deny access to a secure location, or perform similar predefined tasks. For example, the alert may be transmitted if it is determined that the user 312 is trying to access the computer terminal.

According to further embodiments, the processing device 204 may be further configured to detect entry of personal information into a computing terminal, wherein the personal information corresponds to the user, wherein the communication device 202 may be further configured to transmit a query to the location tracking device. The location tracking device may be configured to transmit the user location in response to receiving the query.

According to further embodiments, the communication device 202 may be further configured to receive one or more of a safe location and a safe terminal indicator. For example, users may pre-define safe locations, such as stores or restaurants, at which an operation may be performed without first verifying the physical location of the location tracking device. Further, the users may pre-define safe terminals that may be authorized to perform an operation without first verifying the physical location of the location tracking device. Accordingly, the processing device 204 may be further configured to perform a second comparison of one or more of the safe location and the safe terminal indicator with one or more of a terminal location and a terminal indicator of the computing terminal, respectively. Accordingly, the authenticating may be further based on a second result of the second comparison. The second result may indicate one or more of a location match and a terminal match, wherein the location match corresponds to the terminal location being within a predetermined distance of the safe location, wherein the terminal match corresponds to the terminal indicator being identical to the safe terminal indicator, wherein the user is authenticated independent of the first result. For example, this functionality may enable a user to make a purchase at a neighborhood grocery store without bringing the location tracking device. Yet further, the communication device 202 may be further configured to receive one or more of the first predetermined threshold value and the predetermined distance from an electronic device associated with the user.

According to further embodiments, the processing device 204 may be further configured to identify a behavioral pattern corresponding to the user based on analysis of multiple user locations and multiple terminal locations. Thereafter, the processing device 204 may be further configured to perform a third comparison of the terminal location with the behavioral pattern of the user. Accordingly, the authenticating may be further based on a third result of the third comparison, wherein the user is authenticated independent of the first result. For example, this may allow a user to make a purchase at a neighborhood grocery store that the user visits regularly without bringing the location tracking device along.

According to further embodiments, the system 200 may also include a storage device configured to store the user location and a timestamp corresponding to receipt of the user location. Accordingly, the processing device 204 may be further configured to determine the distance between the user location and the terminal location exceeding the first predetermined threshold value, and detect an absence of a response from the location tracking device, wherein the response may be based on the query. Accordingly, the processing device 204 may be further configured to retrieve a latest user location from the storage device based on the detecting. Yet further, the processing device 204 may be further configured to perform a fourth comparison of the distance with a second predetermined threshold value, wherein the authenticating is further based on a fourth result of the fourth comparison, wherein the communication device 202 may be further configured to transmit a query to the location tracking device based on the determination of the distance exceeding the first predetermined threshold value.

This functionality may allow a user to perform operations when the location tracking device fails to send a location due to some reason, such as, absence of GPS signal, battery drained, and device failure. This situation may be detected by transmitting a query to the location tracker and detecting a time-out (a no response). Based on this, the system 200 may retrieve the last known location of the location tracker and permit authentication if the last known location is within a reasonable distance (the second predetermined threshold value) of the computing terminal. As shown in FIG. 3, the second predetermined threshold value may be a distance 314 from the computing terminal 306. Therefore, the second predetermined threshold defines a circular region within a circle 316. Further, a ring shaped region 318 between the circle 310 and the circle 316 may define a grace-distance. The users, such as the user 312, may be allowed to perform operations if they were last located within the grace-distance, in cases of failure of location tracking device.

The second predetermined threshold may be specified by the user. Further, the second predetermined threshold may be automatically determined by the system 200 based on known environmental conditions corresponding to different computing terminals. For example, some computing terminals may be located inside buildings where GPS reception may be very poor. Accordingly, the system 200 may determine the second predetermined threshold value based on the size of such buildings.

In further embodiments, the processing device 204 may be further configured to determine a time duration between a first timestamp corresponding to receipt of the latest user location and a second timestamp corresponding to receipt of the terminal location and generate the second predetermined threshold value based on each of the distance and the time duration. Therefore, the system 200 may consider both the distance between the last known location and the terminal location and also the time duration to infer whether the user may have reasonably traveled the distance within the time duration based on, for example, speed limits (practical or regulatory limits) on routes connecting the last known location and the terminal location.

In further embodiments, the processing device 204 may be further configured to retrieve transportation data corresponding to one or more transportation means between the latest user location and the terminal location. The transportation data may include one or more travel distances and one or more travel times corresponding to the one or more transportation means. Further, the processing device 204 may be configured to perform a fifth comparison of one or more of the distance and the time duration with the transportation data, wherein the authenticating is based further on a fifth result of the fifth comparison. Therefore, the system 200 may retrieve transport information (for example, from Google Maps™) in order to consider travel distance and travel time in inferring the possibility of the user having traveled the distance within the time duration. The travel distance may be an on-route distance which may be different from the point-to-point distance previously calculated by the system 200.

Figure 4:
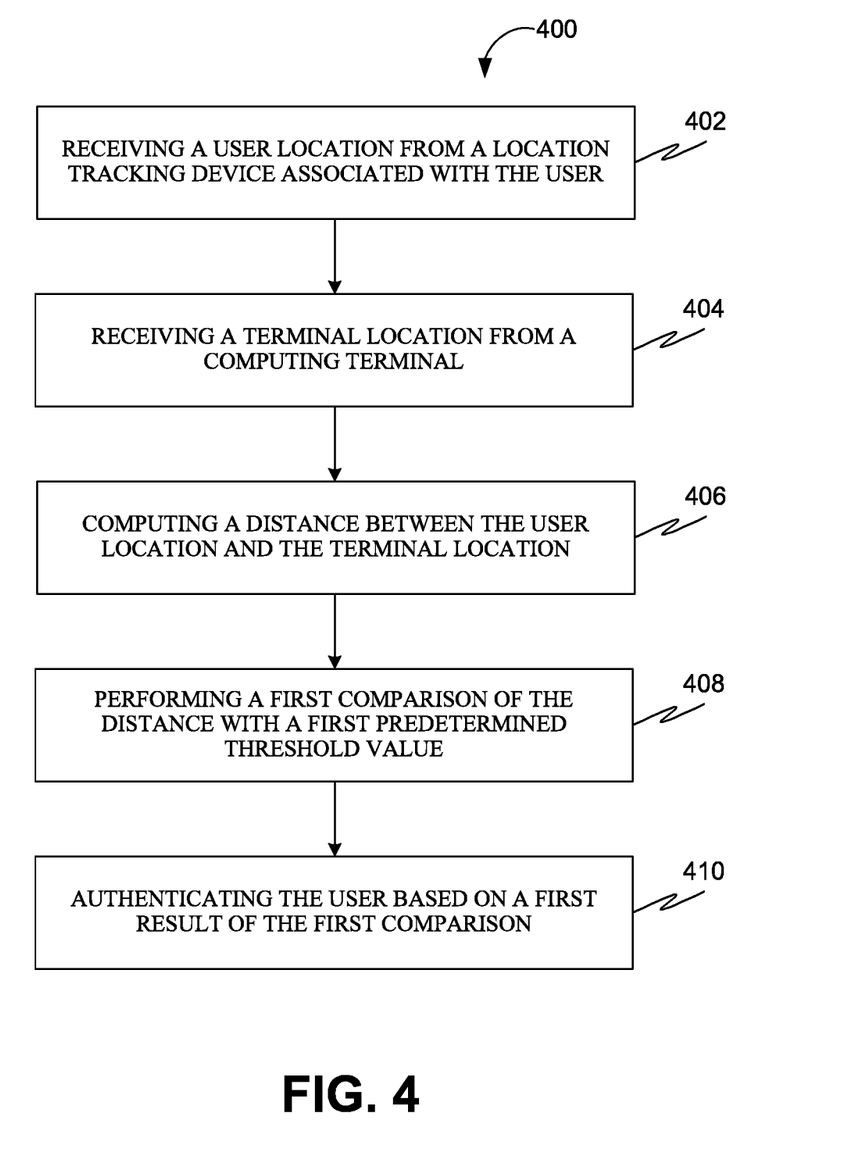
FIG. 4 illustrates a flowchart of a method of authenticating a user based on location data in accordance with some embodiments.

FIG. 4 illustrates a flowchart of a method 400 of authenticating a user based on location data in accordance with some embodiments.

At 402, the method 400 includes receiving, using a communication device (such as the communication device 202), a user location from a location tracking device (such as the smartphone 304) associated with the user (such as the user 302).

At 404, the method 400 includes receiving, using the communication device, a terminal location from a computing terminal (such as the computing terminal 306).

At 406, the method 400 includes computing, using a processing device (such as the processing device 204), a distance between the user location and the terminal location.

At 408, the method 400 includes performing, using the processing device, a first comparison of the distance with a first predetermined threshold value;

At 410, the method 400 includes authenticating, using the processing device, the user based on a first result of the first comparison.

In further embodiments, the method 400 may include comprising transmitting, using the communication device, an alert to an electronic device associated with the user, wherein the alert is transmitted based on the distance exceeding the first predetermined threshold value.

In further embodiments, the method 400 may include detecting, using the processing device, entry of personal information into the computing terminal, wherein the personal information corresponds to the user. Further, the method 400 may include transmitting, using the communication device, a query to the location tracking device, wherein the location tracking device transmits the user location in response to receiving the query.

In further embodiments, the method 400 may include receiving, using the communication device, one or more of a safe location and a safe terminal indicator. Further, the method 400 may include performing, using the processing device, a second comparison of one or more of the safe location and the safe terminal indicator with one or more of the terminal location and a terminal indicator of the computing terminal respectively, wherein the authenticating may be further based on a second result of the second comparison. The second result may indicate one or more of a location match and a terminal match, wherein the location match corresponds to the terminal location being within a predetermined distance of the safe location, wherein the terminal match corresponds to the terminal indicator being identical to the safe terminal indicator, wherein the user is authenticated independent of the first result. Moreover, the method 400 may include receiving, using the communication device, one or more of the first predetermined threshold value and the predetermined distance from an electronic device associated with the user.

In some further embodiments, the method 400 may include identifying, using the processing device, a behavioral pattern corresponding to the user based on analysis of multiple user locations and multiple terminal locations. Further, the method 400 may include performing, using the processing device, a third comparison of the terminal location with the behavioral pattern of the user, wherein the authenticating may be further based on a third result of the third comparison, wherein the user is authenticated independent of the first result.

In some further embodiments, the method 400 may include storing, using a storage device, the user location and a timestamp corresponding to receipt of the user location. Further, the method 400 may include determining, using the processing device, the distance between the user location and the terminal location exceeding the first predetermined threshold value. Yet further, the method 400 may include transmitting, using the communication device, a query to the location tracking device based on the determining. Further, the method 400 may include detecting, using the processing device, an absence of a response from the location tracking device, wherein the response is based on the query. Yet further, the method 400 may include retrieving a latest user location from the storage device based on the detecting. Moreover, the method 400 may include performing, using the processing device, a fourth comparison of the distance with a second predetermined threshold value, wherein the authenticating is further based on a fourth result of the fourth comparison.

Further, the method 400 may include determining, using the processing device, a time duration between a first timestamp corresponding to receipt of the latest user location and a second timestamp corresponding to receipt of the terminal location. Moreover, the method 400 may include generating, using the processing device, the second predetermined threshold value based on each of the distance and the time duration.

Yet further, the method 400 may include retrieving transportation data corresponding to one or more transportation means between the latest user location and the terminal location, wherein the transportation data comprises one or more travel distances and one or more travel times corresponding to the one or more transportation means. Further, the method 400 may include performing, using the processing device, a fifth comparison of one or more of the distance and the time duration with the transportation data, wherein the authenticating is based further on a fifth result of the fifth comparison.

Figure 5:
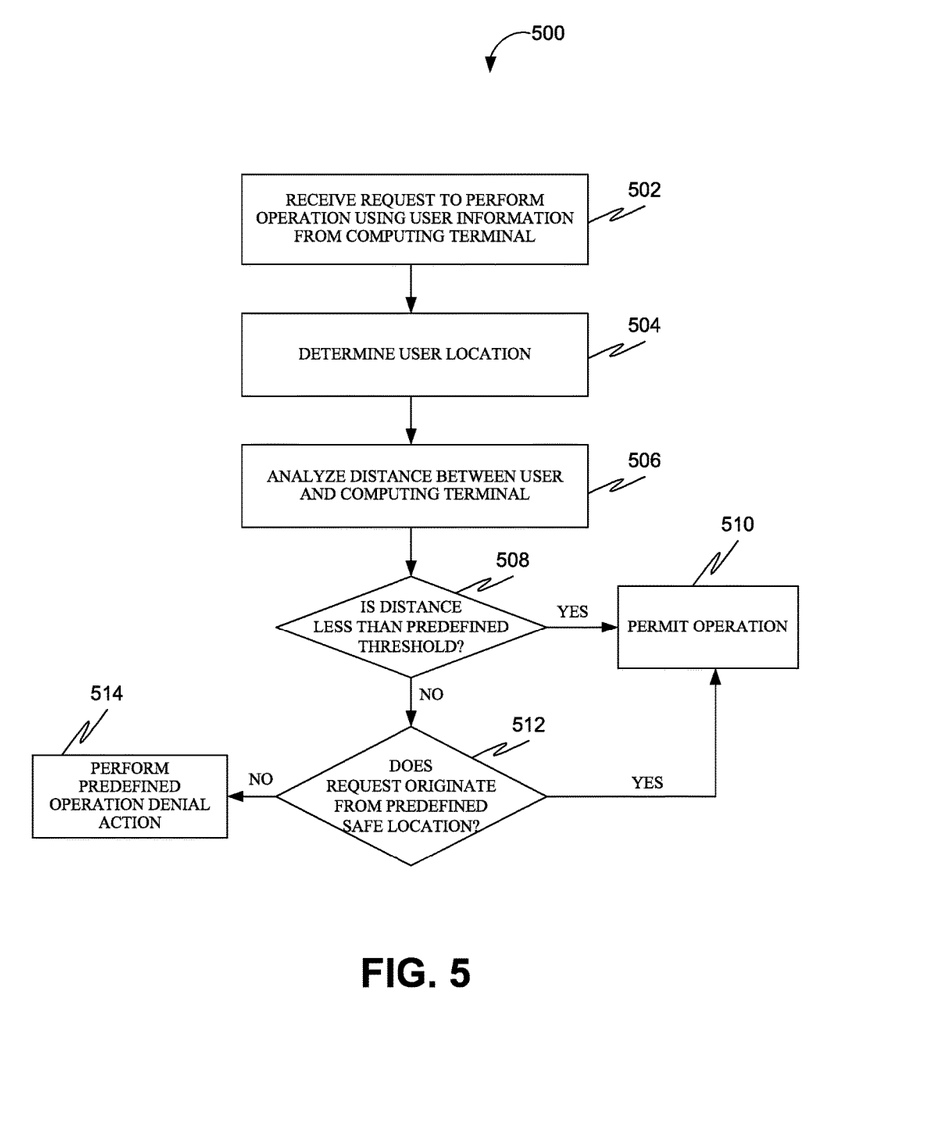
FIG. 5 illustrates a flowchart of a method of authenticating a user based on location data in accordance with some embodiments.

FIG. 5 illustrates a flowchart of a method 500 of authenticating a user based on location data in accordance with an exemplary embodiment. At 502, the method 500 includes receiving, using a communication device (such as the communication device 202), request to perform an operation using user information from a computing terminal (such as the computing terminal 306).

At 504, the method 500 includes determining the location of a user (such as the user 302). A location tracking device (such as the smartphone 304) may send the location of the user.

At 506, the method 500 includes analyzing, using a processing device (such as the processing device 204) distance between user and computing terminal. Thereafter, at 508, it is determined if the distance is less than a predefined threshold. If it is determined that the distance is less than the predefined threshold, then the method 500 goes to 510, where the operation is permitted.

However, if it is determined that the distance is more than the predefined threshold, then the method 500 goes to 512. At 512, it is determined if the request originated from a predefined safe location. If it is determined that the request originated from a predefined safe location, then the method 500 goes to 510, where the operation is permitted.

However, at 512, if it is determined that the request originated outside the predefined safe location, then the method 500 goes to 514. At 514, the method 500 includes performing, using a processing device, a predefined operation denial action.

Figure 6:
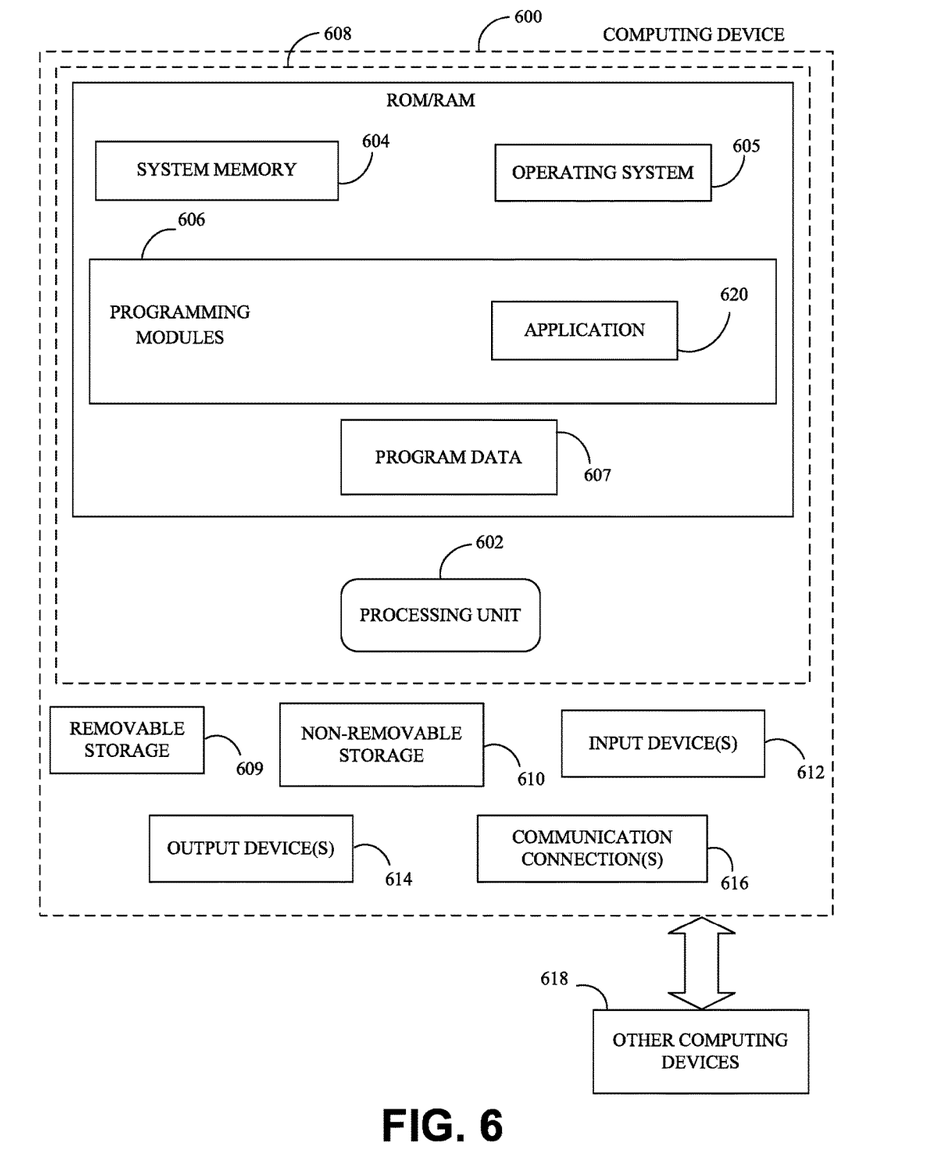
FIG. 6 illustrates an exemplary computing system that may be employed to implement processing functionality for various embodiments.

FIG. 6 is a block diagram of a system including computing device 600. Consistent with an embodiment of the disclosure, the aforementioned memory storage and processing unit may be implemented in a computing device, such as computing device 600 of FIG. 6. Any suitable combination of hardware, software, or firmware may be used to implement the memory storage and processing unit. For example, the memory storage and processing unit may be implemented with computing device 600 or any of other computing devices 618, in combination with computing device 600. The aforementioned system, device, and processors are examples and other systems, devices, and processors may comprise the aforementioned memory storage and processing unit, consistent with embodiments of the disclosure.

With reference to FIG. 6, a system consistent with an embodiment of the disclosure may include a computing device or cloud service, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination. System memory 604 may include operating system 605, one or more programming modules 606, and may include a program data 607. Operating system 605, for example, may be suitable for controlling computing device 600's operation. In one embodiment, programming modules 606 may include image encoding module, machine learning module and image classifying module. Furthermore, embodiments of the disclosure may be practiced in conjunction with a graphics library, other operating systems, or any other application program and is not limited to any particular application or system. This basic configuration is illustrated in FIG. 6 by those components within a dashed line 608.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer-readable instructions, data structures, program modules, or other data. System memory 604, removable storage 609, and non-removable storage 610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a touch input device, etc. Output device(s) 614 such as a display, speakers, a printer, etc. may also be included. The aforementioned devices are examples and others may be used.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 604, including operating system 605. While executing on processing unit 602, programming modules 606 (e.g., application 620) may perform processes including, for example, one or more stages of methods 400 and 500 as described above. The aforementioned process is an example, and processing unit 602 may perform other processes. Other programming modules that may be used in accordance with embodiments of the present disclosure may include image encoding applications, machine learning application, image classifiers etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like cloud storage, hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

DETAIL DESCRIPTIONS OF THE EMBODIMENTS

A method of authenticating a user based on location data is provided. The method may include receiving, using a communication device, a user location from a location tracking device associated with the user. Further, the method may include receiving, using the communication device, a terminal location from a computing terminal. Further, the method may include computing, using a processing device, a distance between the user location and the terminal location. Further, the method may include performing, using the processing device, a first comparison of the distance with a first predetermined threshold value. Further, the method may include authenticating, using the processing device, the user based on a first result of the first comparison.

In some embodiments, the method may further include: detecting, using the processing device, entry of personal information into the computing terminal. Further, the personal information corresponds to the user; and transmitting, using the communication device, a query to the location tracking device. Further, the location tracking device transmits the user location in response to receiving the query.

In some embodiments, the method may further include transmitting, using the communication device, an alert to an electronic device associated with the user. Further, the alert may be transmitted based on the distance exceeding the first predetermined threshold value.

In some embodiments, the method may further include: receiving, using the communication device, one or more of a safe location and a safe terminal indicator; and performing, using the processing device, a second comparison of one or more of the safe location and the safe terminal indicator with one or more of the terminal location and a terminal indicator of the computing terminal respectively. Further, the authenticating may be further based on a second result of the second comparison.

In some embodiments, the second result indicates one or more of a location match and a terminal match. Further, the location match corresponds to the terminal location being within a predetermined distance of the safe location. Further, the terminal match corresponds to the terminal indicator being identical to the safe terminal indicator. Further, the user may be authenticated independent of the first result.

In some embodiments, the method may further include receiving, using the communication device, one or more of the first predetermined threshold value and the predetermined distance from an electronic device associated with the user.

In some embodiments, the method may further include: identifying, using the processing device, a behavioral pattern corresponding to the user based on analysis of multiple user locations and multiple terminal locations; and performing, using the processing device, a third comparison of the terminal location with the behavioral pattern of the user. Further, the authenticating may be further based on a third result of the third comparison. Further, the user may be authenticated independent of the first result.

In some embodiments, the method may further include: storing, using a storage device, the user location and a timestamp corresponding to receipt of the user location; determining, using the processing device, the distance between the user location and the terminal location exceeding the first predetermined threshold value; transmitting, using the communication device, a query to the location tracking device based on the determining; detecting, using the processing device, an absence of a response from the location tracking device. Further, the response may be based on the query; retrieving a latest user location from the storage device based on the detecting; and performing, using the processing device, a fourth comparison of the distance with a second predetermined threshold value. Further, the authenticating may be further based on a fourth result of the fourth comparison.

In some embodiments, the method may further include: determining, using the processing device, a time duration between a first timestamp corresponding to receipt of the latest user location and a second timestamp corresponding to receipt of the terminal location; and generating, using the processing device, the second predetermined threshold value based on each of the distance and the time duration.

In some embodiments, the method may further include: retrieving transportation data corresponding to at least one transportation means between the latest user location and the terminal location. Further, the transportation data may include at least one travel distance and at least one travel time corresponding to the at least one transportation means; and performing, using the processing device, a fifth comparison of one or more of the distance and the time duration with the transportation data. Further, the authenticating may be based further on a fifth result of the fifth comparison.

Further, a system for authenticating a user based on location data is provided. The system may include a communication device configured to receive a user location from a location tracking device associated with the user. Further, the communication device may be configured to receive a terminal location from a computing terminal. Further, the system may include a processing device configured to compute a distance between the user location and the terminal location. Further, the processing device may be configured to perform a first comparison of the distance with a first predetermined threshold value. Further, the processing device may be configured to authenticate the user based on a first result of the first comparison.

In some embodiments, the processing device may be further configured to detect entry of personal information into the computing terminal. Further, the personal information corresponds to the user. Further, the communication device may be further configured to transmit a query to the location tracking device. Further, the location tracking device may be configured to transmit the user location in response to receiving the query.

In some embodiments, the communication device may be further configured to transmit an alert to an electronic device associated with the user. Further, the alert may be transmitted based on the distance exceeding the first predetermined threshold value.

In some embodiments, the communication device may be further configured to receive one or more of a safe location and a safe terminal indicator. Further, the processing device may be further configured to perform a second comparison of one or more of the safe location and the safe terminal indicator with one or more of the terminal location and a terminal indicator of the computing terminal respectively. Further, the authenticating may be further based on a second result of the second comparison.

In some embodiments, the second result indicates one or more of a location match and a terminal match. Further, the location match corresponds to the terminal location being within a predetermined distance of the safe location. Further, the terminal match corresponds to the terminal indicator being identical to the safe terminal indicator. Further, the user may be authenticated independent of the first result.

In some embodiments, the communication device may be further configured to receive one or more of the first predetermined threshold value and the predetermined distance from an electronic device associated with the user.

In some embodiments, the processing device may be further configured to: identify a behavioral pattern corresponding to the user based on analysis of a plurality of user locations and a plurality of terminal locations; and perform a third comparison of the terminal location with the behavioral pattern of the user. Further, the authenticating may be further based on a third result of the third comparison. Further, the user may be authenticated independent of the first result.

In some embodiments, the system may further include a storage device configure to store the user location and a timestamp corresponding to receipt of the user location. Further, the processing device may be further to: determine the distance between the user location and the terminal location exceeding the first predetermined threshold value; detect an absence of a response from the location tracking device. Further, the response may be based on the query; retrieve a latest user location from the storage device based on the detecting; and perform a fourth comparison of the distance with a second predetermined threshold value. Further, the authenticating may be further based on a fourth result of the fourth comparison. Further, the communication device may be further configured to transmit a query to the location tracking device based on the determination of the distance exceeding the first predetermined threshold value.

In some embodiments, the processing device may be further configured to: determine a time duration between a first timestamp corresponding to receipt of the latest user location and a second timestamp corresponding to receipt of the terminal location; and generate the second predetermined threshold value based on each of the distance and the time duration.

In some embodiments, the processing device may be further configured to: retrieve transportation data corresponding to at least one transportation means between the latest user location and the terminal location. Further, the transportation data may include at least one travel distance and at least one travel time corresponding to the at least one transportation means; and perform a fifth comparison of one or more of the distance and the time duration with the transportation data. Further, the authenticating may be based further on a fifth result of the fifth comparison.

Although the invention has been explained in relation to its preferred embodiment, it is to be understood that many other possible modifications and variations can be made without departing from the spirit and scope of the invention.

I claim:

1. A method of authenticating a user based on location data, the method comprising:
    receiving, using a communication device, a user location from a location tracking device associated with the user;
    receiving, using the communication device, a terminal location from a computing terminal;
    computing, using a processing device, a distance between the user location and the terminal location;
    performing, using the processing device, a first comparison of the distance with a first predetermined threshold value;
    authenticating, using the processing device, the user based on a first result of the first comparison; and
    transmitting, using the communication device, an alert to an electronic device associated with the user, wherein the alert is transmitted based on the distance exceeding the first predetermined threshold value.

2. The method of claim 1 further comprising:
    detecting, using the processing device, entry of personal information into the computing terminal, wherein the personal information corresponds to the user; and
    transmitting, using the communication device, a query to the location tracking device, wherein the location tracking device transmits the user location in response to receiving the query.

3. The method of claim 1 further comprising:
    receiving, using the communication device, at least one of a safe location and a safe terminal indicator; and
    performing, using the processing device, a second comparison of at least one of the safe location and the safe terminal indicator with at least one of the terminal location and a terminal indicator of the computing terminal respectively, wherein the authenticating is further based on a second result of the second comparison.

4. The method of claim 3, wherein the second result indicates at least one of a location match and a terminal match, wherein the location match corresponds to the terminal location being within a predetermined distance of the safe location, wherein the terminal match corresponds to the terminal indicator being identical to the safe terminal indicator, wherein the user is authenticated independent of the first result.

5. The method of claim 4 further comprising receiving, using the communication device, at least one of the first predetermined threshold value and the predetermined distance from an electronic device associated with the user.

6. The method of claim 1 further comprising:
    identifying, using the processing device, a behavioral pattern corresponding to the user based on analysis of a plurality of user locations and a plurality of terminal locations; and
    performing, using the processing device, a third comparison of the terminal location with the behavioral pattern of the user, wherein the authenticating is further based on a third result of the third comparison, wherein the user is authenticated independent of the first result.

7. The method of claim 1 further comprising:
    storing, using a storage device, the user location and a timestamp corresponding to receipt of the user location;
    determining, using the processing device, the distance between the user location and the terminal location exceeding the first predetermined threshold value;
    transmitting, using the communication device, a query to the location tracking device based on the determining;
    detecting, using the processing device, an absence of a response from the location tracking device, wherein the response is based on the query;
    retrieving a latest user location from the storage device based on the detecting; and
    performing, using the processing device, a fourth comparison of the distance with a second predetermined threshold value, wherein the authenticating is further based on a fourth result of the fourth comparison.

8. The method of claim 7 further comprising:
determining, using the processing device, a time duration between a first timestamp corresponding to receipt of the latest user location and a second timestamp corresponding to receipt of the terminal location; and
generating, using the processing device, the second predetermined threshold value based on each of the distance and the time duration.

9. The method of claim 8 further comprising:
retrieving transportation data corresponding to at least one transportation means between the latest user location and the terminal location, wherein the transportation data comprises at least one travel distance and at least one travel time corresponding to the at least one transportation means; and
performing, using the processing device, a fifth comparison of at least one of the distance and the time duration with the transportation data, wherein the authenticating is based further on a fifth result of the fifth comparison.

10. A system for authenticating a user based on location data, the system comprising:
a communication device configured to:
receive a user location from a location tracking device associated with the user; and
receive a terminal location from a computing terminal; and
a processing device configured to:
compute a distance between the user location and the terminal location;
perform a first comparison of the distance with a first predetermined threshold value;
authenticate the user based on a first result of the first comparison;
transmit an alert to an electronic device associated with the user, wherein the alert is transmitted based on the distance exceeding the first predetermined threshold value.

11. The system of claim 10, wherein the processing device is further configured to detect entry of personal information into the computing terminal, wherein the personal information corresponds to the user, wherein the communication device is further configured to transmit a query to the location tracking device, wherein the location tracking device is configured to transmit the user location in response to receiving the query.

12. The system of claim 10, wherein the communication device is further configured to receive at least one of a safe location and a safe terminal indicator, wherein the processing device is further configured to perform a second comparison of at least one of the safe location and the safe terminal indicator with at least one of the terminal location and a terminal indicator of the computing terminal respectively, wherein the authenticating is further based on a second result of the second comparison.

13. The system of claim 12, wherein the second result indicates at least one of a location match and a terminal match, wherein the location match corresponds to the terminal location being within a predetermined distance of the safe location, wherein the terminal match corresponds to the terminal indicator being identical to the safe terminal indicator, wherein the user is authenticated independent of the first result.

14. The system of claim 13, wherein the communication device is further configured to receive at least one of the first predetermined threshold value and the predetermined distance from an electronic device associated with the user.

15. The system of claim 10, wherein the processing device is further configured to:
identify a behavioral pattern corresponding to the user based on analysis of a plurality of user locations and a plurality of terminal locations; and
perform a third comparison of the terminal location with the behavioral pattern of the user, wherein the authenticating is further based on a third result of the third comparison, wherein the user is authenticated independent of the first result.

16. The system of claim 10 further comprising a storage device configure to store the user location and a timestamp corresponding to receipt of the user location, wherein the processing device is further to:
determine the distance between the user location and the terminal location exceeding the first predetermined threshold value;
detect an absence of a response from the location tracking device, wherein the response is based on the query;
retrieve a latest user location from the storage device based on the detecting; and
perform a fourth comparison of the distance with a second predetermined threshold value, wherein the authenticating is further based on a fourth result of the fourth comparison, wherein the communication device is further configured to transmit a query to the location tracking device based on the determination of the distance exceeding the first predetermined threshold value.

17. The system of claim 16, wherein the processing device is further configured to:
determine a time duration between a first timestamp corresponding to receipt of the latest user location and a second timestamp corresponding to receipt of the terminal location; and
generate the second predetermined threshold value based on each of the distance and the time duration.

18. The system of claim 17, wherein the processing device is further configured to:
retrieve transportation data corresponding to at least one transportation means between the latest user location and the terminal location, wherein the transportation data comprises at least one travel distance and at least one travel time corresponding to the at least one transportation means; and
perform a fifth comparison of at least one of the distance and the time duration with the transportation data, wherein the authenticating is based further on a fifth result of the fifth comparison.

* * * * *